United States Patent [19]
Kitani et al.

[11] Patent Number: 5,690,020
[45] Date of Patent: Nov. 25, 1997

[54] KOJI PRODUCTION SYSTEM

[75] Inventors: Masanobu Kitani, 17-15, Nagasaki 2-chome, Toshima-ku, Tokyo; Mitsunobu Kitani; Haruhiko Kitani, both of Tokyo, all of Japan

[73] Assignees: Masanobu Kitani; Hakuyo Co., Ltd., both of Tokyo, Japan

[21] Appl. No.: 748,404

[22] Filed: Nov. 13, 1996

[30] Foreign Application Priority Data

Nov. 15, 1995 [JP] Japan .................................. 7-319798

[51] Int. Cl.⁶ .................................. A23L 1/00; A23L 1/34; A23L 3/00
[52] U.S. Cl. .................................. 99/470; 99/476; 99/483; 99/516; 99/276
[58] Field of Search .................................. 99/467, 468, 470, 99/472, 473–476, 483, 516, 534, 536, 276–278; 219/400, 401; 126/21 A; 426/444, 462, 463, 618, 507, 510, 523

[56] References Cited

U.S. PATENT DOCUMENTS

| | | | |
|---|---|---|---|
| 4,409,794 | 10/1983 | Kitani | 426/618 |
| 4,543,878 | 10/1985 | Luchetti | 426/507 |
| 4,571,341 | 2/1986 | Sugimura | 426/510 |
| 4,674,890 | 6/1987 | Kojima et al. | 99/327 |
| 4,870,022 | 9/1989 | Fukuyasu et al. | 99/275 |
| 4,873,917 | 10/1989 | Sugimura et al. | 99/494 X |
| 5,118,626 | 6/1992 | Hashimoto et al. | 99/486 |
| 5,170,697 | 12/1992 | Kuboyama | 99/470 |
| 5,221,817 | 6/1993 | Ota | 219/492 X |
| 5,512,310 | 4/1996 | Graef | 99/536 X |
| 5,525,782 | 6/1996 | Yoneno et al. | 99/468 X |
| 5,586,492 | 12/1996 | Graef | 99/516 |
| 5,616,356 | 4/1997 | Buhler et al. | 426/523 X |

*Primary Examiner*—Timothy F. Simone
*Attorney, Agent, or Firm*—Browdy and Neimark

[57] ABSTRACT

The present invention relates to a koji production system capable of finely adjusting the water content of koji rice grains, comprising arranging a cooling and dehumidifying chamber and heating system 8 by means of a heat-pump process with a freezing cycle arranged in aerated circuit 5, in combination with heater H. In accordance with the present invention, koji can be produced at a large amount or at an extremely small amount, depending on the demand, and additionally, koji of various qualities such as high-quality koji for producing high-grade sake can be produced efficiently.

11 Claims, 3 Drawing Sheets

KOJI PRODUCTION SYSTEM

FIELD OF THE INVENTION

The present invention relates to a koji production system. More specifically, the present invention relates to a system for efficiently producing koji suitable for brewery of refined sake, distilled spirits, soy bean paste, sweet sake and the like. In accordance with the present invention, koji can be ideally produced by adjusting the water content of rice grains to the optimum water content so that an objective koji might be produced. Therefore, koji with white hyphae ("haze koji") suitable for producing high-grade refined sake, for example ginjyo sake (which means sake produced from a rice species suitable for sake brewery and at a rice ratio of 60% or less). Additionally, koji can be produced appropriately at a desirable amount such as at a large amount to an extremely small amount (for example, koji at a given amount to about ⅕ to ¹⁄₅₀ fold the amount).

PRIOR ART

As general mechanical processes of producing koji, it is known a process comprising steaming and boiling refined rice, leaving the rice to cool in atmosphere, inoculating seed koji in the rice, drawing the rice into a mechanical koji production chamber, depositing the rice at a depth of 20 to 30 cm, and then forcing air adjusted to a temperature and a humidity, continuously or inconsistently, for a period for producing koji.

By all of such mechanical processes of producing koji, however, enforced ventilation, namely forcibly passing hot air with increased temperature and elevated humidity, is carried out through the koji layer while drawing fresh air from the outside. Therefore, the water contents inside rice grains and on the surface thereof are disordered, which damages the principle of the traditional koji production process of a koji-lid type to simply grow the hyphae uselessly. Thus, it has been very difficult to produce deeply haze koji most suitable for the production of refined sake. Because the rice ratio which conventionally has been 70 to 75% is decreased down to 65 to 35% more recently so as to improve the quality of refined sake, rice grains of themselves readily absorb water which has disadvantageous effects on koji production. Such effects act in a synergistic manner with the disorder of the level of carbonate gas so that the microorganism koji cannot infiltrate into the inside of rice grains. Consequently, the increase of koji with whitened hyphae on and inside steamed rice ("so haze koji") is often observed.

Thus, the present inventors have made long-term investigations as to the physiology of the microorganism koji. Finally, the inventors have focused their attention to the fact that the difference in the water content of steam-boiled rice grains brings about significant difference in the quality of koji. Then, they have developed a system capable of finely adjusting the water content with less change of air temperature, by arranging a cooling device and a heating device in a parallel manner via a heat-pump system with a freezing cycle and passing circulating air continuously through these two devices (Japanese Patent Publication No. Sho 58-49158).

Because the system can readily balance cooling with heating in a fashion suitable for the level of koji and because the heat generated during cooling can be used for heating, the generated energy can be controlled depending on the charged amount of koji. Therefore, the system is an excellent system from the standpoint of energy.

Because such system cannot satisfactorily cope with significant change of koji level or cannot satisfactorily control the difference in dryness and wetness finely, however, it is unavoidable that the yield of koji with whitened hyphae is decreased or the water content of koji to be drawn outside is elevated, disadvantageously.

PROBLEMS TO BE SOLVED BY THE INVENTION

It is an object of the present invention to overcome such disadvantages and develop a novel system to produce objective high-quality koji very efficiently at a large scale or an extremely small scale if desired.

MEANS FOR SOLVING THE PROBLEMS

The present invention has been made to achieve the object. For producing a desired level of koji, for example for producing extremely less koji in view of the capacity of a machine for producing koji, namely an extremely lower level of koji, a machine for producing koji by means of a novel and useful heat-pump type cooling and heating system developed earlier by the inventors could not produce the objective koji. The inventors have made investigations about the cause. Consequently, the inventors have firstly found that the deprived heat during cooling is decreased due to the lower level of koji so that even heat pumping cannot satisfactorily carry out heating in the heating tank.

For the purpose of overcoming the problem, the inventors have made attempts to heat the heating tank by using only an electric heater. However, it has been absolutely impossible to stabilize the temperature by heating only with an electric heater under inconsistent air ventilation, because the time lag from temperature sensing with a sensor until heater actuation is so large that delicate temperature control cannot be attained.

When air ventilation stops when koji temperature is down to a predetermined temperature, the heater is simultaneously switched off but the residual heat is so significant that problems may occur such as extra-heating of the system. Additionally, the control of ventilation is then deteriorated.

Thus, the prevent inventors have made further investigations on the basis of these new findings. Then, the inventors have arranged the heat-pump type cooling and heating system by means of freezing cycle developed by the inventors themselves in a ventilation circulating circuit. Additionally, the inventors have arranged an electric heater therein. The inventors have confirmed that the aforementioned problems have been overcome entirely. Subsequently, the inventors have continued investigations. Thus, the inventors have attained the present invention.

In accordance with the present invention, one or more heaters are arranged in the heating portion of the heat-pump type cooling and heating system by means of freezing cycle. By arranging a heater (secondary heater) as has been described above in accordance with the present invention, satisfactory heating required for koji production can be carried out. Therefore, the system can firstly cope with the production of koji at an extremely low level.

Accordingly, any heater capable of heating air may be used, for example, indirect heaters by means of various heating media or heating media other than electric heaters. As such media, use may be made of water, oil, various solvents, air and the like. Indirect heating can be carried out by making circulating air in the heating portion in contact with the pipe conducting them. One or more heaters may be arranged in series or in parallel arrangement.

Figure 1:
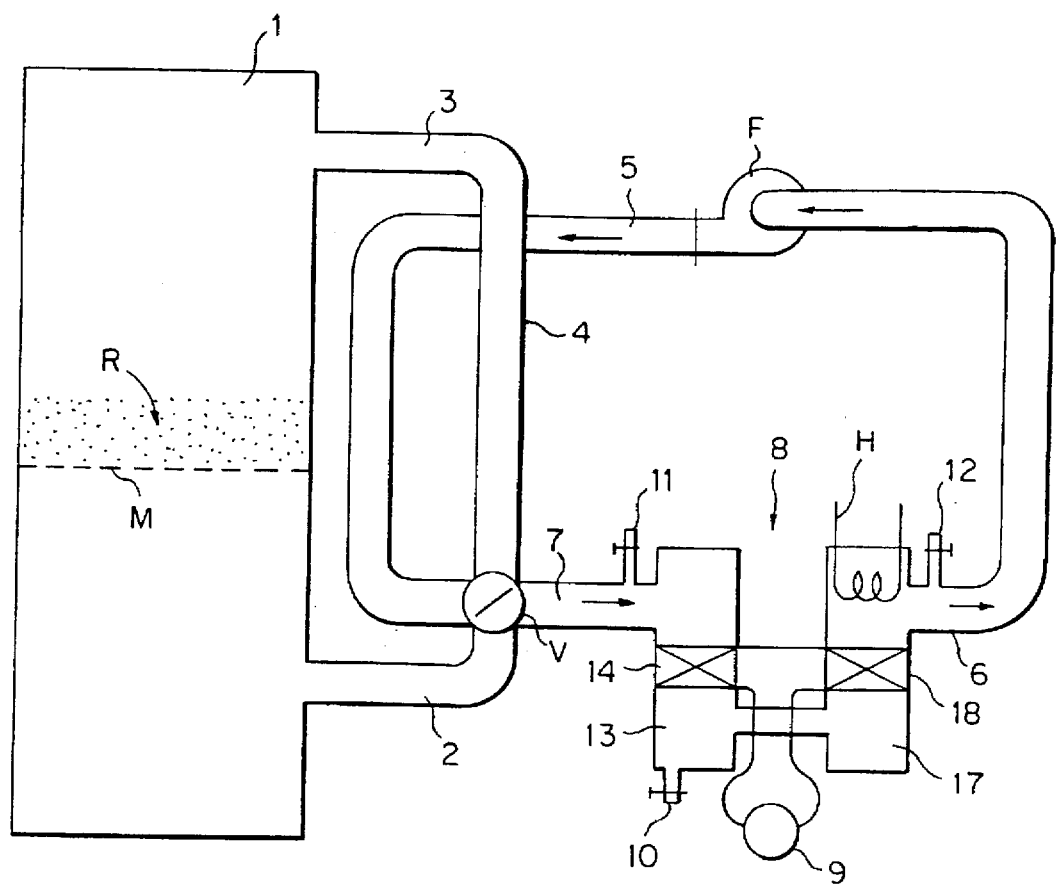
FIG. 1 is a flow scheme of the whole system.

One embodiment of the system in accordance with the present invention will be described with reference to attached drawings. In FIG. 1, a koji production tank 1 has a network plate M arranged inside the tank, and koji rice R is mounted on the plate (in the figure, only one step is depicted for simplification) and air under controls of the temperature and humidity is transferred from air charging pipe 2 for koji production. On the upper top of koji production chamber 1 is arranged an air discharging pipe 3 from passing air is discharged. An air pipe 4 is formed by connecting the air charging pipe 2 with the discharging pipe 3. As shown in the figure, furthermore, air circulation may be done from downward to upward or adversely, by operating valve V; otherwise, alternative air ventilation may be satisfactory from upward to downward and from downward to upward.

The air pipe 4 is connected through the valve V with a ventilated circulating pass 5, to adjust ventilation or the direction of ventilation by operating the valve V. The ventilation circulating pass 5 is a pipe connecting air outlet 6 of heat pump 8 with air inlet 7 thereof, so as to arrange air blower F intermediately therein. In the figure, one air blower is illustrated.

Reference numeral 8 is a heat-pump type system for cooling together with dehumidification and heating, wherein one compressor 9 can work for cooling and heating together. In the example of FIG. 1, dehumidifying chamber 13 and heating chamber 17 are independent chambers, and the two chambers are structurally connected together via a pass. For the connecting portions between the pass and the individual chambers, use may be made of an insulating material such as polyvinyl chloride or rubber. In the figure, an evaporator 14 is arranged inside the dehumidifying chamber 13; and a condenser 18 is arranged inside the heating chamber 17. Also, heater H is to be arranged inside the heating chamber 17; in the present example, one electric heater 1 is arranged therein. In the figure, a drain pipe 10 works to remove water droplets generated during cooling. 11 is a discharge pipe of some air; when the carbonate gas concentration is elevated during koji production, air is partially discharged through the pipe while fresh air is introduced via air incorporation pipe 12 to adjust the carbonate gas concentration to a concentration suitable for koji production, so that the carbonate gas concentration is controlled to 1 to 10%, preferably 2 to 8% and more preferably 3 to 6%.

Consequently, the oxygen concentration is decreased on the surface of rice grains with less aerial protrusion of the spore stems of aerial hyphae. Thus, the hyphae infiltrate into the inside of the rice grains for humidity and nutrients. In other words, the phenomenon called haze-komi (which means the state of whitened hyphae) occurs. Then in the inside, no spore stem protrudes so that the hyphae can be maintained at their relatively young stage, wherein enzymes are generated with higher enzymatic activities with no occurrence of haze-ochi (meaning no proliferation of koji on the surface of steamed rice or inside the rice, involving the dry state of rice grains), recovering alcohol at a higher yield.

Figure 2:
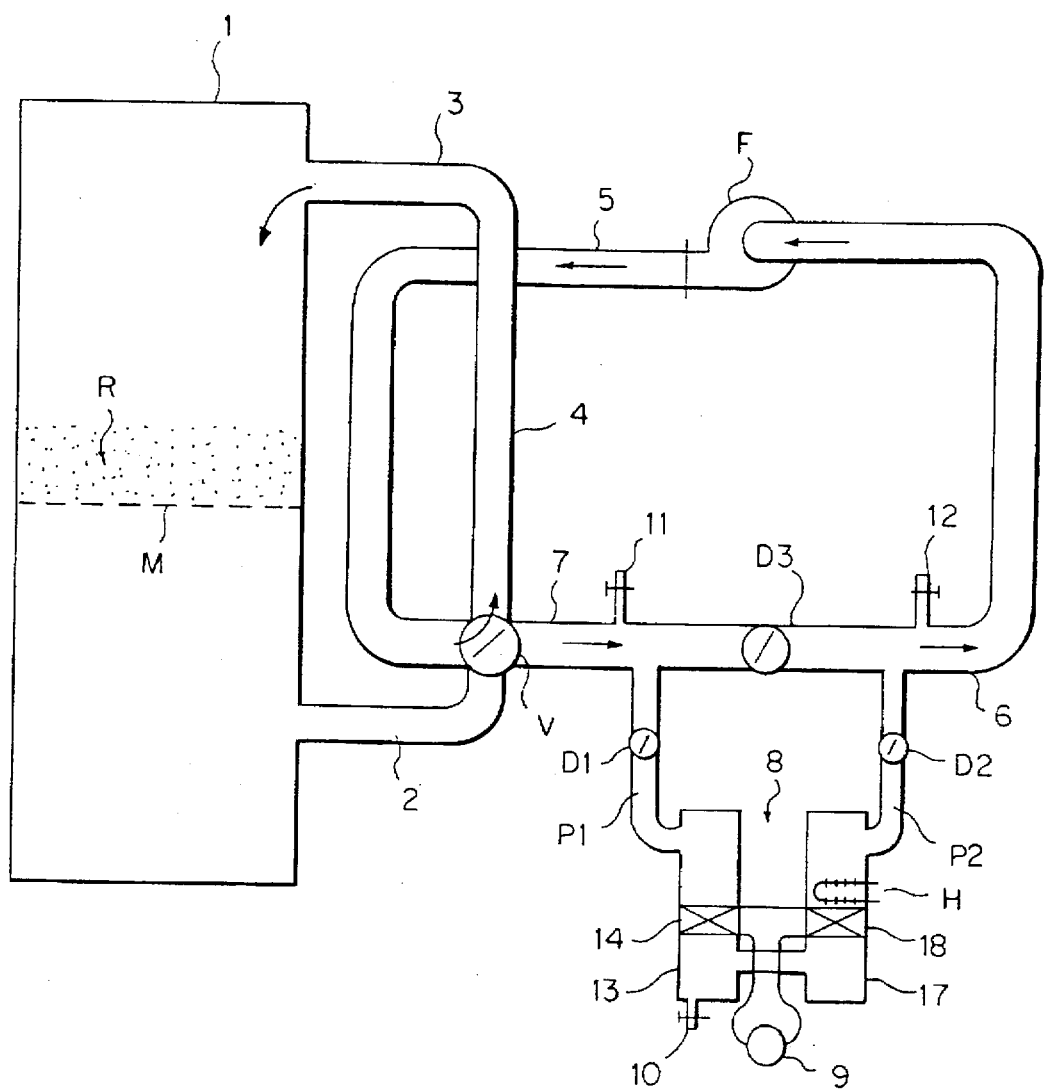
FIG. 2 is another flow scheme of the whole system.

As shown in FIG. 2, furthermore, a bypass circuit is arranged wherein bypass pipes P1 and P2 are arranged at appropriate portions of the circulating pass and dampers D1, D2 and D3 are also arranged on the connecting portions of the circulating pass with the bypass pipes. By opening and closing the dampers, the air capacity of circulating air may be adjusted to adjust the air flow in the dehumidifying circuit.

Figure 3:
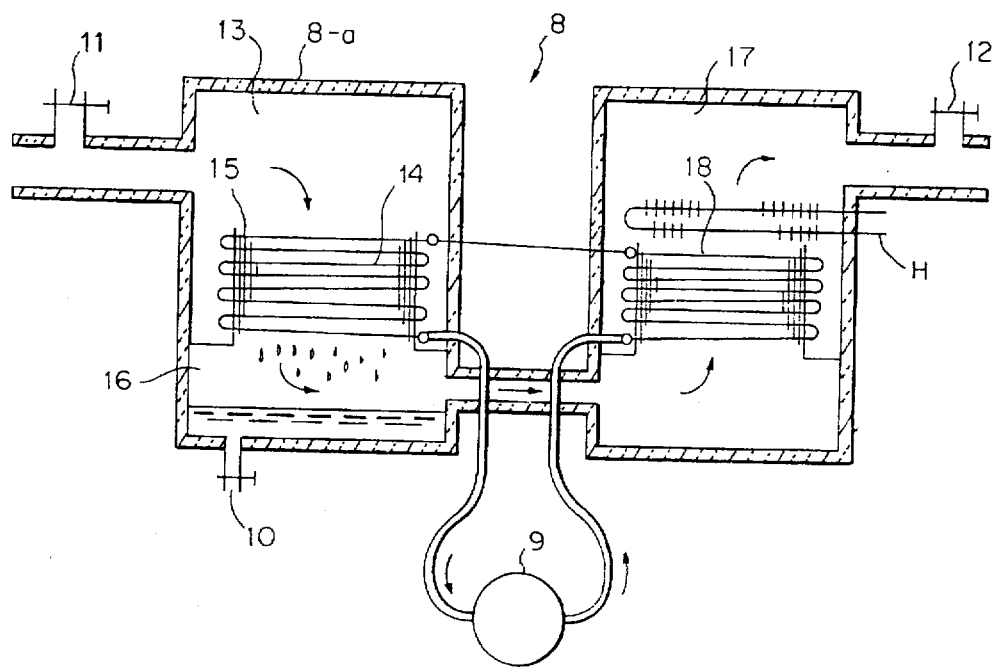
FIG. 3 is a side cross section of the system carrying out cooling together with dehumidification and heating.

FIG. 3 depicts the details of the system for cooling with dehumidification and heating, wherein 8 depicts the system for cooling with dehumidification and heating and wherein dehumidifying chamber 13 and heating chamber 17 are arranged while the entirety of the system is covered with insulating material 8-a. Evaporator 14 composing the freezing cycle is arranged in the dehumidifying chamber 13, where the cooling medium compressed in compressor 9 and passing through condenser 18 is evaporated to cool fin 15 and condense the water content in the circulating air into water droplets. The condensed water droplets are reserved in water tank 16 and occasionally discharged from drain pipe 10. The condenser 18 of a heat-pump apparatus by means of freezing cycle is arranged in the heating chamber 17, and a gaseous cooling medium compressed and heated with the compressor 9 in the freezing cycle passes through the condenser 18. By using the condensing heat, heating is carried out. Additionally, heater H is arranged in the heating chamber 17, and the secondary heater supports the temperature increase to sufficiently carry out the objective fine adjustment of the water content.

As has been described above, a cooling device (evaporator) of a heat-pump apparatus by means of freezing cycle and a heating device (condenser) are arranged in a parallel manner to each other intermediately in the air circulating pass in the chamber for adjusting water content, such as koji chamber, and by making the flow of circulating air, the water generated during koji production and the like is removed, whereby the water content of koji rice and steamed rice can be adjusted finely. Thus, the system is quite an innovative system, but is not satisfactory. For example, the system cannot attain the primary objective in the case of production of koji at an extremely small scale. So as to overcome the problem, thus, a heater is simultaneously arranged as has been described above.

In accordance with the present invention, the water contents and temperatures of bed koji rice, koji rice and steamed rice can appropriately be maintained, which not only enables free production of koji at a large scale to an extremely small scale but also enables the production of appropriate koji of desirable quality. Thus, koji of a tsuki-haze type (koji with some hyphae infiltrated onto the surface of steamed rice and inside the rice but some parts of the rice surface are not infiltrated by the koji) can be produced freely and efficiently.

As has been described above, the system exerts excellent actions and advantages. In accordance with the present invention, use may be made of the koji production tank of the conventional type wherein a network plate is arranged inside to mount rice on the plate. Additionally, by using a koji production tank of the following type, the maintenance thereof in particular can be done efficiently. Furthermore, high-quality koji can be produced. Together with the use of the cooling and heating system of the heat-pump type, koji of a desirable amount can be produced freely.

One example of the koji production tank preferable for use in accordance with the present invention has koji production boxes on two to 10 steps and removable partition plates in one to eight rows in the longitudinal direction. The koji production tank may be used also as a koji production tank for ginjyo, so the tank can generate tsuki-haze koji and so whitened hyphae-having koji of the tsuki-haze type, most preferable for pure rice sake and pure rice dai-ginjyo sake (meaning sake produced from a rice species being suitable for sake brewery and having a rice ratio of 40% or less). Further, the tank can generate an appropriate amount of koji if demanded, for example, 20 kg of koji for seed mash, 30 kg of initially adding koji when seed mash is produced, 40 kg of intermediate koji on day 2, and 60 kg of final tome-koji.

In accordance with the present invention, still furthermore, the koji production tank has the interior wall composed of a plate of a metal such as stainless steel and alumite as well as a heater apparatus for heating, such as hot floor wire and plate heater outside the wall together with koji production boxes with two to 10 steps, so the tank may be modified in a koji production tank for ginjyo (ginjyo means to produce sake from a rice species suitable for sake brewery and with a rice ratio of 60% or less), where partition plates composed of a plate of a metal such as stainless steel and alumite or a wood plate such as cedar or a synthetic resin plate such as polyester in one to eight rows in the longitudinal direction.

One preferable embodiment of the koji production tank to be used in accordance with the present invention will be described with reference to FIG. 4; A depicts a koji production tank working also for ginjyo, which is depicted as 1 in FIG. 1; 101 depicts the outer wall in a box form, having inner wall 122; on the front surface of the tank, a door is arranged in the form of a biparting or uniparting type or a sliding type or a ceiling type hanging from the ceiling and automatically moving up an down; the entirety thereof can be sealed.

The air with the humidity and temperature adjusted in such manner is to be transferred through air charging pipe 2 into the koji production chamber. Reference numeral 106 depicts a koji production box with the bottom composed of metal network 107 and the like. The air humidity-and temperature-adjusted passes through koji layer 108 deposited in the koji production box 106 and reaches the upper top of the koji production chamber, which then passes through gas discharging pipe 3 and through valve V to re-enter heat pump 8. With air blower F to adjust the temperature and humidity, the air is to be circulated. By occasionally reversing the direction of air circulation, the temperature- and humidity-adjusted air can be transferred from the top. Also, some part of the air may be discharged from gaseous outlet 11.

In multi-step koji production chamber A preferable for use as a koji production tank serving also for ginjyo, the inner circulation of temperature- and humidity-adjusted air promotes oxygen consumption via the respiration of the microorganism koji in the koji layer 108, involving the increase of carbonate gas, which realizes an optimum condition for the microorganism koji to infiltrate into the center of rice grains. Therefore, almost no incorporation of fresh air is needed, but oxygen may lack during the highest growth of the microorganism koji. Therefore, by preliminarily setting a timer, a small amount of fresh air may be incorporated from fresh air incorporating pipe 12. By dehumidification, generation of coated haze koji may be prevented. By dehumidifying sometimes the water content of the surface of koji, useless growth of aerial hyphae may be prevented.

By such manner, the surface of rice grains may be put to a state with oxygen shortage. Also by occasionally removing water metabolically generated on the surface, the surface is put to a hungry state. Thus, hyphae may infiltrate into the inside of rice grains for demanding the water content and nutrients in the inside of rice grains.

Reference numeral 112 depicts an internally arranged plate heater or hot floor wire heater, which is switched on if needed to prevent the variation of koji quality through partial cooling of the koji layer 108. The plate heater or hot floor wire heater may be arranged entirely, or only on the bottom and ceiling or partially. Plate heater or hot floor wire heater is internally arranged in FIG. 4. If a wood plate such as cedar is in a removable fashion arranged on the ceiling, bottom or periphery of the inside of the inner wall 122, the plate may absorb the water metabolically generated by and discharged from koji, so tsuki-haze koji may effectively be produced readily. The inner face of a cedar plate absorbs humidity, but the outer face in contact with the inner wall is readily dried, leading to a large difference in dryness and wetness, which characteristically generates tsuki-haze koji readily. Such koji is particularly needed for ginjyo koji. Also, the drying up of koji may be prevented by arranging a water feeder (a container containing water, sponge wetted with water and the like).

Figure 4:
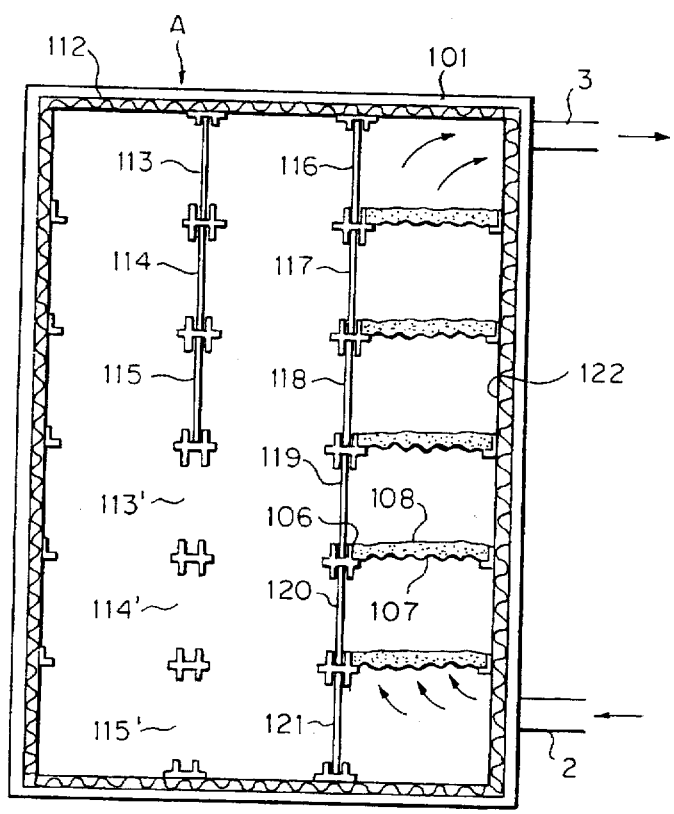
FIG. 4 is longitudinal explanatory cross-sectional view of the koji production chamber serving also for ginjyo.

FIG. 4 depicts koji production boxes in three rows and on five steps. In accordance with the present invention, koji production boxes may be arranged optionally in two to nine rows and on two to 10 steps.

Partition plates 113, 114 and 115 are not necessary during koji production in FIG. 4; when koji is produced in two right rows in the longitudinal direction, additional three partition plates are sequentially inserted below the partition plate 115 (to be inserted in the portions of 113', 114' and 115', not shown in the figure) but partition plates 116 to 121 are to be removed. Simple depiction is illustrated herein. Inserting the same partition plates 116, 117, 118, 119, 120 and 121 as those described above from the lengthwise direction, only the right-most chamber is used in the koji production machine A, which state is depicted in FIG. 4. By removing the partition plates, an objective amount of koji can be freely produced.

Removing partition plates 116 to 121 and inserting partition plates 113 to 115', a culture tank of two-row and 350-kg type may be generated. Removing partition plates 113 to 121, koji may be totally produced in the tank of 15-case and 520-kg type. In the case of one-row type, the tank may generate dai-ginjyo koji of 600 kg to 1-ton charge (rice ratio of 35%–40%–50%); in the case of two-row type, the tank may generate ginjyo koji of 1.5-ton charge (rice ratio is 55% to 60% per case).

At a rice ratio of 65% to 70%, general koji may generate hon-jyozo sake (meaning sake produced from raw materials of refined rice at a refining ratio of 70% or less, rice koji, water and brewing alcohol) and pure rice sake (sake from raw materials of a rice species suitable for brewing at a refining ratio of 60% or less, rice koji and water) at a koji layer of a thickness of 4 cm to 5 cm. The ratio of koji to be used is generally 22% to 23% of the charge. One single such machine can be used as culture tanks of a large volume, a medium volume and a small volume.

By inserting partition plates as shown by 116 to 121 and arranging the plates in one row at a thickness of 2 cm in one case, koji for dai-ginjyo koji can be produced at a small amount such as about 15 kg, which is 30 kg in the case of two-step deposition or 45 kg at three-step deposition or 75 kg at five-step deposition. For the case of two-row type, by inserting partition plates to 113 to 115' and removing partition plates of 116 to 121, koji for dai-ginjyo koji can be produced at a thickness of 4 cm (30 kg) in 10 cases.

Removing all the partition plates of 113 to 121, the tank can serve as a culture tank of 520-kg type at a thickness of 5 cm (35 kg) in 15 cases, to produce koji for general types of sake such as pure rice sake and truly brewed sake.

Using an automatic koji production machine arranged with a sealed type culture tank (Hakuyo automatic koji production machine) in accordance with the present invention, an experiment was made to produce koji at an extremely thin koji thickness of 2 cm to 5 cm. As a control, alternatively, an experiment was made using a hand-made small-lid koji of an open type (a 1.8-liter volume at a koji thickness of 4 cm to 4.5 cm). The results of the comparative experiments are shown in Tables 1 and 2.

TABLE 1

Automatic koji production machine of a multi-step deposition type (sealed type)

| Charging tank | | Liquefying enzyme (U/g Koji) | Saccharifying enzyme (U/g Koji) | Acid enzyme (U/g Koji) | Bacterial acidity (c.c) |
| --- | --- | --- | --- | --- | --- |
| 168 | Seed mash koji | 374 | 184 | 2141 | 0.5 |
| 168 | Adding koji | 277 | 171 | 986 | 0.4 |
| 168 | Intermediate koji | 365 | 172 | 1272 | 0.4 |
| 168 | Final koji | 332 | 213 | 1137 | 0.2 |

Liquefying enzyme: α-amylase
Saccharifying enzyme: glucoamylase
Acid enzyme; acid protease

TABLE 2

Hand-made type small-lid koji production (open type)

| | Liquefying enzyme (U/g Koji) | Saccharifying enzyme (U/g Koji) | Acid enzyme (U/g Koji) | Bacterial acidity (c.c) |
| --- | --- | --- | --- | --- |
| Seed mash koji | 273 | 155 | 1193 | 2.7 |
| Adding koji | 254 | 116 | 1076 | 4.0 |
| Intermediate koji | 246 | 118 | 945 | 0.4 |
| Final koji | 269 | 118 | 878 | 0.6 |

Liquefying enzyme: α-amylase
Saccharifying enzyme: glucoamylase
Acid enzyme; acid protease Using the present system, two or more types of koji can be produced by charging those at a rice ratio of 50% or more into the first step and fifth step and simultaneously charging those at a ratio of 40% into the third step and fourth step. Additionally, not only dai-ginjyo koji in the center has a lower haze loss than the small-lid koji; but also the dai-ginjyo koji has a deeper haze komi. Furthermore, the saccharifying enzyme (glucoamylase) generated has a stronger activity by 32% on average. It is demonstrated that with a longer mash period, ginjyo sake and dai-ginjyo sake were produced at a higher pure alcohol yield by 10% to 20% owing to the fermentation at lower temperatures and no haze loss (which means no infiltration of hyphae on the surface of rice grains or into the inside thereof, involving dried rice grains). The dai-ginjyo koji in the central step contained less oxygenating enzymes with more whitened koji.

In the case of hand-made type, on the contrary, the surface area is larger by about 3- to 6-fold than the surface area of multi-step type, so that haze loss amounts to several fold with shallower haze-komi (which means the infiltration of hyphae). Therefore, the activity of the saccharifying enzyme is low, involving a lower pure alcohol yield per one ton (for Yamada Nishiki, refined rice ratio of 40%, sake residue ratio of about 50%; pure alcohol yield of 280 to 290 liters; Report of Experimental Brewery Institute of Niigata Prefecture). If comparison is made with the same brand of rice as the raw material, hand-made small-lid koji (1.8-liter volume to 2.7-liter volume) and large-box koji (9-liter volume to 18-liter volume) bring about higher pure alcohol yields than those by open-lid type.

DESCRIPTION OF THE PREFERRED EMBODIMENTS

In koji production machine A serving also for ginjyo as shown in FIG. 4, a hot floor wire heater is internally located; and stainless-steel plates are inserted into all of the ceiling, bottom and wall surfaces to set koji production boxes in three rows each with five steps, while two rows of partition plates composed of stainless-steel plates can be inserted to use one longitudinal row of koji production tanks from the right or to use two longitudinal rows of koji production boxes by sifting the partition plates by one row to the left or to remove all the partition plates to totally produce koji of 520 kg. For example, in the case of five-step deposition for producing koji at a small amount such as 20 kg to 100 kg, partition plates of 116 to 121 can be inserted to generate koji in the koji production tank of only one row at the right-most side.

In such manner, koji can be produced at an extremely small amount such as ⅕ to 1/50 fold the given amount. Sifting the partition plates in the second row, koji can be produced at a medium amount. Removing all the partition plates, then, the total amount (maximum amount) of koji can be produced. Thus, single such system can work as for example three culture tanks. For example, the koji thickness of one-step deposition can be freely modified into 2-cm deposition to 10-cm deposition. Additionally because koji is at multi-step deposition, the amount of koji can be freely modified. Thus, the present invention is really innovative. By arranging a biparting door in front of the koji production chamber, the koji production boxes may be inserted or drawn out through the opened door to do the maintenance works from both the sides.

In FIG. 4, temperature-adjusted and humidity-adjusted air is transferred through an air duct from the bottom of the koji production tank by means of a blower; by using the koji production tank of a single row or two rows longitudinally or by using the tank in three rows without partition plates, the strength of the blower can be adjusted to weaken or strengthen the blowing.

In the koji production box with the bottom made of metal networks, steamed rice inoculated with the microorganism koji is spread at a deposition thickness of 3 cm to 5 cm, which is then inserted into the koji production machine to initiate koji production. One koji production box can produce dai-ginjyo koji of about 14 kg at a 2-cm deposition thickness or about 21 kg at a 3-cm deposition thickness (refined rice ratio of 35 to 40%); the box can produce chu-ginjyo koji of about 28 kg at a 4-cm deposition thickness (refined rice ratio of 50 to 60%) and regular koji of about 35 kg at a 5-cm deposition thickness (refined rice ratio of 65 to 70%).

By blowing air with the temperature and the humidity adjusted from top to bottom in the arrow direction as shown in FIG. 2 for example, blower damper V is rotated at an angle of 90 degrees each time to blow air from bottom to top in the adverse direction. In summary, the direction of air blowing may be changed alternatively. In the figure, damper D3 can adjust the air capacity into the bypass pipe. Because the deposition is at an ultra-thin thickness with almost no thickness, short-term air blowing can control the material temperature, so that koji with extremely less oxygenating enzymes can be produced. As has been described above, uniform temperature and humidity can be retained wholly. Furthermore, koji produced can be cooled.

In the present Example, use was made of a koji production system equipped with a koji production tank serving also as ginjyo in accordance with the present invention, to produce koji for dai-ginjyo at a yield of 150 kg for charging 750 kg of dai-ginjyo.

Firstly, seed mash koji of 20 kg should be prepared. Inserting all of the cedar partition plates, namely 116, 117, 118, 119, 120 and 121 on the left side of the koji production machine of FIG. 1 to use only the koji production box at the third step, uniformly depositing steamed rice (20 kg) with inoculated seed koji at a thickness of about 3 cm in the box, banking the rice and then leaving the rice to stand at a state without air blowing for 8 to 12 hours, initiating blowing of air with the temperature- and humidity adjusted from the bottom or from the top when the koji temperature exceeds 35° C. by preliminarily determining the temperature adjusting program of the temperature- and humidity-adjusted air such that the intermediate procedure should be done at 35° C.; that the final procedure should be done at 38° C. and that the maximum temperature should be at 41° C., and drawing out the koji production box during the intermediate procedure to the final procedure, the maintenance procedure should be done to keep the koji temperature uniformly at a temperature. Since the final procedure, the cooling and heating system is operated together with the heater for air blowing to produce koji under temperature controls while carrying out appropriate dehumidification. About 20 kg of seed mash koji was produced in about 30 hours.

Then, initially adding koji of 30 kg will be produced. Depositing steamed rice with inoculated seed koji at a thickness of 4.8 cm in the third-step koji production box and drawing out the koji in about 28 hours, initially adding koji of 30 kg was produced.

In the same manner as the case of the initially adding koji, intermediate koji (40 kg) in the two steps (the third step and fourth step) was produced in 27 hours; final koji (60 kg) was produced in three steps (the third, fourth and fifth steps) in 22 hours.

In accordance with the present invention, the use of the heat-pump type cooling and heating system by means of freezing cycle with a heater enables appropriate heating by means of the heater, when sufficient heating cannot be done by means of the heat pump because of lesser amount of koji or when caloric loss may occur during the operation of the present system, so that the removal of the water content from koji can be done in a more stable manner to efficiently recover koji of the objective quality and at the objective amount.

After leaving steamed rice to stand and inoculating the microorganism koji in the steamed rice, the present system can process the rice as well. Furthermore, koji cultured approximately overnight can be cultured in the present system until the time of drawing out koji comes. The removal of the water content from koji is primarily carried out within 10 hours or so after the final procedure; the water metabolically generated from the microorganism koji can efficiently be removed from the circulating air by means of the present system.

In the case of intermittent air blowing, air warmed by means of the heater may bring about appropriate temperature at the initial air blowing time; gradually then, the operation of the heat pump may bring about a given temperature in the heating tank.

The system of the present invention can cope freely with the amount of koji; by arranging the partition plates to produce koji at an extremely small amount for example 30 to 40 kg, heating via the heat pump may not satisfactorily work because of lesser condensing heat. In such case, however, any heater such as electric heater should be operated as an auxiliary heater (secondary heater) for use in producing the objective koji with no difficulty.

By heating koji rice to elevate the koji temperature with no objective to remove water from the koji rice, furthermore, freezing cycles should be stopped to operate only the heater for air blowing to increase the temperature of the culture tank and achieve the increase of koji temperature. Through warm air from the heater, drying can be done at some degree.

As has been described above, the organic combination of a heat pump and a heater can bring about various desirable air conditionings and stabilized circulating air, so that various desirable types of koji can efficiently be produced; the combination can bring about a remarkable effect such as efficient production of haze-koji preferable for production of superior refined sake in particular. Additionally, the present invention can bring about a dramatic effect such as efficient production of koji at a desirable amount such as a large amount to an extremely small amount.

The combined use of a heater and a heat pump can make circulating air more stabilized than the circulating air by heating with a heater alone; and the combined use is at a higher energy saving effect. Thus, the present invention is superior from industrial standpoint.

By using a multi-step koji production tank as a koji production tank which may be used as a koji production tank serving also for ginjyo, individual effects described above may be enhanced further, such as quality improvement, coping with the amount of koji to be produced, and energy saving; additionally, maintenance works can be done more efficiently. Thus, superior effects can be exerted from the respect of labor control and safety.

By arranging longitudinally one to eight rows of partition plates in a removable fashion in accordance with the present invention, general-grade koji can be produced at a mass production scale. Alternatively, by inserting partition plates in the first to second rows, a small amount of koji can be produced for pure rice ginjyo sake. Using the koji production tank serving also for ginjyo in accordance with the present invention, the same automatic temperature-humidity control can be programmed as in the case of koji lid type, so that koji manufacturing technicians can take long rest at day time with no night work. Thus, they can rest at night satisfactorily.

What is claimed is:

1. A koji production system capable of producing koji at a large scale or an extremely small scale depending on the demand, and also capable of finely adjusting the water content of koji rice grains, comprising arranging a cooling and dehumidifying chamber and a heating chamber by means of a heat-pump process with a freezing cycle used in the circuit thereof, wherein both the chambers are arranged as separate chambers and connected through a passage to each other and wherein secondary heaters are arranged in the heating chamber.

2. A koji production system according to claim 1, characterized by using a multi-shelf koji production tank with koji production boxes each with 2 to 10 step deposition and with removable separating plates at one to eight rows arranged therein, wherein the amount of produced koji can be increased or decreased.

3. A koji production system according to claim 2, further comprising a by-pass pipe in the circuit where the action of a damper adjusts the air level of circulating air whereby koji production is carried out in an atmosphere of a carbonate gas level of 1 to 10%.

4. A koji production system according to claim 3, wherein pine plates are spread on the inner wall, ceiling and bottom of the koji production tank and/or the inner face of the door thereof and pine plates are also used as the separating plates.

5. A koji production system according to claim 4, wherein a koji production tank arranging a water feeder on the bottom part thereof is used.

6. A koji production system according to claim 1, further comprising by a by-pass pipe in the circuit where the action of a damper adjusts the air level of circulating air whereby koji production is carried out in an atmosphere of a carbonate gas level of 1 to 10%.

7. A koji production system according to claim 6, wherein pine plates are spread on the inner wall, ceiling and bottom of the koji production tank and/or the inner face of the door thereof and pine plates are also used as the separating plates.

8. A koji production system according to claim 7, wherein a koji production tank arranging a water feeder on the bottom part thereof is used.

9. A koji production system according to claim 1, wherein pine plates are spread on the inner wall, ceiling and bottom of the koji production tank and/or the inner face of the door thereof and pine plates are also used as the separating plates.

10. A koji production system according to claim 9, wherein a koji production tank arranging a water feeder on the bottom part thereof is used.

11. A koji production system according to claim 1, wherein a koji production tank arranging a water feeder on the bottom part thereof is used.

* * * * *